United States Patent
Wells et al.

(10) Patent No.: US 11,818,428 B2
(45) Date of Patent: *Nov. 14, 2023

(54) IDENTIFYING VIEWING CHARACTERISTICS OF AN AUDIENCE OF A CONTENT CHANNEL

(71) Applicant: Google LLC, Mountain View, CA (US)

(72) Inventors: Bjorn Wells, Sydney (AU); Guillaume Derolez, Dublin (IE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,155

(22) Filed: Nov. 7, 2022

(65) Prior Publication Data

US 2023/0139539 A1    May 4, 2023

Related U.S. Application Data

(63) Continuation of application No. 17/175,580, filed on Feb. 12, 2021, now Pat. No. 11,496,801, which is a
(Continued)

(51) Int. Cl.
*H04N 21/442* (2011.01)
*H04N 21/2743* (2011.01)
(Continued)

(52) U.S. Cl.
CPC ... *H04N 21/44226* (2020.08); *H04N 21/2743* (2013.01); *H04N 21/44204* (2013.01); *H04N 21/4524* (2013.01)

(58) Field of Classification Search
None
See application file for complete search history.

(56) References Cited

U.S. PATENT DOCUMENTS

| 8,151,194 B1 | 4/2012 | Chan |
| 8,291,452 B1 | 10/2012 | Yong |

(Continued)

FOREIGN PATENT DOCUMENTS

| CN | 1332937 C | 1/2002 |
| CN | 1625901 A | 6/2005 |

(Continued)

OTHER PUBLICATIONS

Chinese Patent Application No. 202011558826.1, Office Action dated Aug. 3, 2021, 16 pages.

(Continued)

*Primary Examiner* — Junior O Mendoza
(74) *Attorney, Agent, or Firm* — Lowenstein Sandler LLP

(57) ABSTRACT

Systems and methods are disclosed for identifying viewing characteristics of an audience of a content channel. A method includes receiving an identification of a channel of interest having a plurality of first videos and being associated with a first channel owner in a network-based media sharing platform that provides a plurality of watch sessions to a plurality of users. The plurality of watch sessions comprises a subset of watch sessions that each include a first watched video from the channel of interest and one or more of a plurality of second watched videos from a plurality of additional channels, each of the plurality of additional channels associated with one of a plurality of second channel owners. The method further includes presenting a notification indicating characteristics of content of an additional channel of the plurality of additional channels, the additional channel comprising a second watched video from at least one watch session in the subset of watch sessions that each comprise the watched video from the channel of interest. The second watch video is associated with a popularity (Continued)

indicator representing lower popularity as compared to other second watch videos from the plurality of watch sessions.

20 Claims, 7 Drawing Sheets

Related U.S. Application Data continuation of application No. 15/997,640, filed on Jun. 4, 2018, now Pat. No. 10,924,803, which is a continuation of application No. 15/091,561, filed on Apr. 5, 2016, now Pat. No. 9,992,539.

(51) Int. Cl.
*H04N 21/25* (2011.01)
*H04N 21/45* (2011.01)

(56) References Cited

U.S. PATENT DOCUMENTS

| | | | |
|---|---|---|---|
| 8,370,874 | B1 | 2/2013 | Chang |
| 8,850,490 | B1 | 9/2014 | Thomas |
| 8,918,330 | B1 | 12/2014 | Winkler |
| 9,992,539 | B2 * | 6/2018 | Wells ............... H04N 21/44204 |
| 10,924,803 | B2 * | 2/2021 | Wells ............... H04N 21/44226 |
| 11,496,801 | B2 * | 11/2022 | Wells ............... H04N 21/44204 |
| 2009/0007178 | A1 | 1/2009 | Artom |
| 2009/0133059 | A1 | 5/2009 | Gibbs |
| 2011/0238754 | A1 | 9/2011 | Dasilva |
| 2011/0321072 | A1 * | 12/2011 | Patterson ........... H04N 21/4756 725/5 |
| 2012/0143871 | A1 | 6/2012 | Liebald |
| 2012/0143911 | A1 | 6/2012 | Liebald |
| 2012/0246671 | A1 | 9/2012 | Wilson |
| 2014/0067940 | A1 | 3/2014 | Li |
| 2014/0310353 | A1 | 10/2014 | Schneider |
| 2015/0039685 | A1 | 2/2015 | Lewis |
| 2017/0083940 | A1 | 3/2017 | Achan |

FOREIGN PATENT DOCUMENTS

| | | | |
|---|---|---|---|
| CN | 103329151 | A | 9/2013 |
| CN | 104395901 | A | 3/2015 |
| CN | 105740014 | A * | 7/2016 |

OTHER PUBLICATIONS

Chinese Patent Application No. 201680078968.3, Office Action dated Mar. 25, 2020, 16 pages.

Anonymous: "YouTube Channel Complete Guide", Oct. 26, 2009 (Oct. 26, 2009), XP055022271, Retrieved from the internet: URL:http://www.clickonf5_org/5455/youtube-channel-complete-guide/ [retrieved on Mar. 19, 2012).

European Patent Application No. 16 829 042.7 Summons to Attend Oral Proceedings dated Dec. 20, 2019, 6 pages.

PCT International Search Report and Written Opinion for International Application No. PCT/US2016/069132, dated Feb. 23, 2017, 8 pages.

* cited by examiner

IDENTIFYING VIEWING CHARACTERISTICS OF AN AUDIENCE OF A CONTENT CHANNEL

RELATED APPLICATIONS

This application is a continuation application of co-pending U.S. patent application Ser. No. 17/175,580, filed Feb. 12, 2021, which is a continuation of U.S. patent application Ser. No. 15/997,640, filed Jun. 4, 2018, now issued as U.S. Pat. No. 10,924,803, which is a continuation of U.S. patent application Ser. No. 15/091,561, filed Apr. 5, 2016, now issued as U.S. Pat. No. 9,992,539, which is herein incorporated by reference.

TECHNICAL FIELD

Aspects and implementations of the present disclosure relate to data processing, and more specifically, to identifying viewing characteristics of an audience of a content channel.

BACKGROUND

Audio and video content can be stored on data servers and provided to users for listening/viewing over the Internet. Applications for supporting the listening/viewing of such audio and video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives, an identification of a channel of interest, the channel of interest having associated videos. The processing device receives data for a plurality of watch sessions where multiple videos are watched during the watch sessions. The processing device identifies at least two watch sessions of the plurality of watch sessions, each identified watch session having a watched video that is associated with the channel of interest. The processing device identifies a most watched channel in the at least two identified watch sessions, the most watched channel being a channel that is most watched by viewers of the channel of interest but that is not the same as the channel of interest.

In another aspect, a processing device receives, an identification of a channel of interest, the channel of interest having associated videos. The processing device receives data for a plurality of watch sessions where multiple videos are watched during the watch sessions. The processing device identifies at least two watch sessions of the plurality of watch sessions, each identified watch session having a watched video that is associated with the channel of interest. The processing device identifies a most watched video in the at least two identified watch sessions, the most watched video being a video that is most watched by viewers of the channel of interest but that is not the same as videos associated with the channel of interest.

In another aspect, a processing device receives, an identification of a channel of interest, the channel of interest having associated videos. The processing device receives data for a plurality of watch sessions where multiple videos are watched during the watch sessions. The processing device identifies at least two watch sessions of the plurality of watch sessions, each identified watch session having a watched video that is associated with the channel of interest. The processing device identifies a most watched topic in the at least two identified watch sessions, the most watched topic being a topic of a highest number of videos in the watch session.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
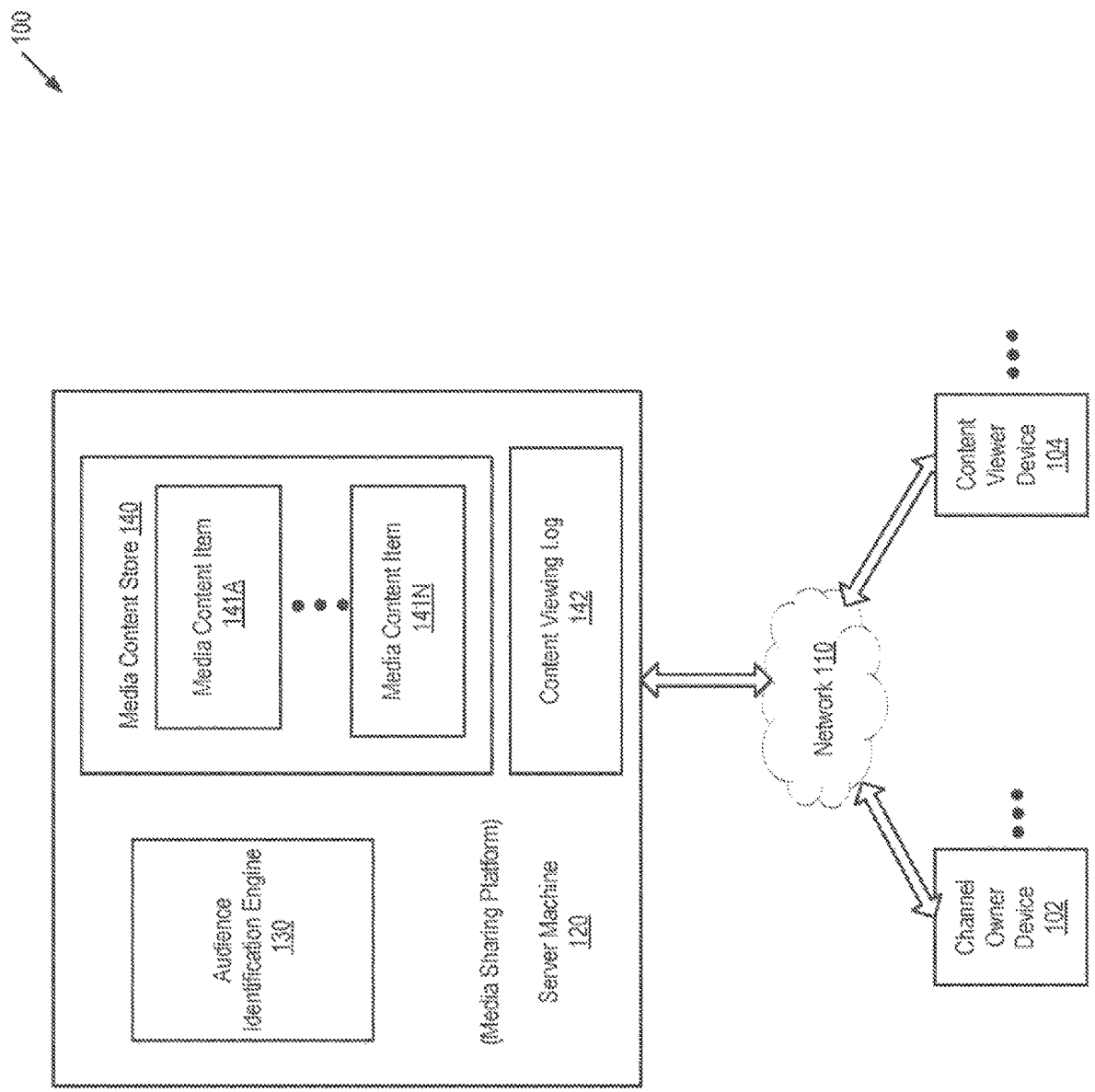
FIG. 1 depicts an illustrative system architecture, in accordance with aspects and implementations of the present disclosure.

Aspects and implementations of the present disclosure are directed to identifying viewing characteristics of an audience of a content channel. The systems and methods disclosed can be applied to media content such as audio and/or video content, images, and/or any other content that can be collected and/or disseminated such as via a media sharing platform. More particularly, it can be appreciated that media sharing platforms can enable content (e.g., videos, etc.) to be organized and provided via channels. A channel can refer to content available from a common source or content having a common topic, theme, or substance. Additionally, a channel can be associated with a channel owner which can be, for example, an individual or entity that provides their own content and/or content owned/created by others to the referenced channel. A channel's content can be presented within a single/unified interface which may be referred to as a 'channel interface.' For example, content viewers that are seeking content associated with a particular channel owner or related to a particular topic can easily access/retrieve such content via the channel interface.

Various reporting tools can enable a channel owner to review/analyze various tendencies or behaviors of their viewing audience (e.g., the group of viewers who view or subscribe to content from their channel). Analyzing the tendencies, etc., of a viewing audience can be advantageous for a channel owner for a number of reasons, e.g., in order to determine which types of content are (or are not) of interest to their viewing audience (based upon which the channel owner can, for example, determine which types of content to create/provide in the future). However, the insight provided by existing reporting tools is relatively limited. For example, such reporting tools may only enable a channel owner to review the number of views that each video on their own channel received. However, it can be appreciated that many content viewers do not simply view content exclusively from a single content channel, but rather engage in viewing sessions in which the viewer views multiple content items (e.g., in a sequence), each of which may originate from a different channel owner. Being that much of the content viewed via media sharing platforms is provided within the context of such viewing sessions (which include content from multiple providers), providing insights/feedback to a content owner only with respect to the content items that make up their own channel can provide a relatively limited perspective on the tendencies, behaviors, etc., of the audience of the referenced channel.

Accordingly, described herein in various embodiments are technologies that enable identifying viewing characteristics of an audience of a content channel. For example, as described herein, in addition to analyzing content viewing instances associated with content originating from a particular content channel, the referenced analysis can further include content viewing instances that occur within viewing sessions that include content originating from such a content channel. Thus, a particular channel owner can be presented not only with information pertaining to viewing instances of content originating from their own channel, but also with information reflecting viewing instances of content originating from other channels which occurred within the same viewing sessions as content originating from the particular channel owner. In doing so, a broader and more comprehensive perspective on the viewing audience of a particular content channel (reflecting not only viewing instances of content from that content channel itself, but also those viewing instances of content from other content channels) can be provided.

For example, various characteristics of those content items that are included in viewing sessions which include a content item from a particular channel owner can be identified. By way of illustration, various topics, tags, and/or other metadata associated with the various videos within the referenced viewing sessions can be identified, e.g., in order to identify those topics that are most common/prevalent across the content items within the referenced sessions. By way of further illustration, the various channels from which the various videos within the referenced viewing sessions originate can be identified, e.g., in order to identify those channels from which the most content items within the referenced sessions originate. By way of yet illustration, the most common/prevalent videos within the referenced viewing sessions can be identified, e.g., in order to identify the most popular videos within the referenced sessions. As described herein, such characteristics, etc., can be provided to a channel owner (e.g., via various notifications, reporting tools/interfaces, etc.). In doing so, the channel owner can be provided with an enhanced/improved perspective on the viewing audience of their content item(s)/channel, based upon which the channel owner can generate and provide additional content that is likely to appeal to such audience.

Accordingly, it can be appreciated that the described technologies are directed to and address specific technical challenges and longstanding deficiencies in multiple technical areas, including but not limited to content delivery. For example, existing technologies do not enable the tracking or analysis of an audience of a particular channel across multiple viewing sessions, such as those which include content from other channels. In contrast, the technologies described herein enable the identification and/or analysis of various characteristics of the viewing audience of a channel, including viewing instances of content items that originate from other channels. In doing so, an enhanced and improved perspective on the content viewing tendencies of viewers of a particular channel can be provided to a channel owner. It can be further appreciated that, as described, the disclosed technologies provide specific, technical solutions to the referenced technical challenges and unmet needs in the referenced technical fields.

At this juncture it should also be noted that various implementations of the disclosed technologies provide numerous advantages and improvements upon existing approaches. As noted, while existing technologies may enable a determination of the manner in which content from a particular channel is being viewed, such technologies do not enable the tracking or analysis of an audience of a particular channel across multiple viewing sessions which may include content from other channels. In contrast, the technologies described herein enable a channel owner to identify and/or analyze various characteristics of the viewing audience of their channel, including viewing instances of content items that originate from other channels. In doing so, the channel owner can be provided with an enhanced perspective on the content viewing tendencies of those users that view their content.

FIG. 1 depicts an illustrative system architecture 100, in accordance with one implementation of the present disclosure. The system architecture 100 includes channel owner device 102, content viewer device 104, and server machine 120. These various elements or components can be connected to one another via network 110, which can be a public network (e.g., the Internet), a private network (e.g., a local area network (LAN) or wide area network (WAN)), or a combination thereof. Additionally, in certain implementations various elements may communicate and/or otherwise interface directly with one another. Further aspects of one or more of the various devices depicted in FIG. 1 are described below with respect to FIGS. 2 and 6.

Channel owner device 102 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. In certain implementations, channel owner device 102 can enable a media channel owner, such as a user or entity that creates or provides media content (e.g., audio content items, video content items, images, etc.) to provide (e.g., upload) such media content items to a server machine (e.g., server machine 120), such as a server configured as a media sharing platform that can allow other users to view or otherwise acquire/obtain access to the provided media content items via the platform. Additionally, channel owner device 102 may run an operating system (OS) that manages hardware and software of the channel owner device 102. Various applications, such as mobile applications ('apps'), web browsers, etc. (not shown) may run on the channel owner device (e.g., on the OS of the channel owner device). Such applications can, for example, enable a user to capture media content (e.g., an audio clip, a video clip, etc.), provide media content (e.g., upload media content to a central server and/or transmit it to another user), receive media content (e.g., via network 110), and/or view, display, manage, or otherwise present media content (e.g., playing a video, listening to a song, etc.), such as via the channel owner device 102. Additionally, in certain implementations, channel owner device 102 can also include and/or incorporate various sensors and/or communications interfaces (including but not limited to those depicted in FIG. 2 with respect to content viewer device 104 and/or described herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

It should also be noted that, in certain implementations, various media content items provided by channel owner device 102 can be presented within an interface (e.g., a webpage, an interface of a mobile application, etc.) that aggregates content items provided by a particular channel owner (e.g., channel owner 102). Such an interface may be referred to as a 'channel interface.' The referenced channel interface can enable a content viewer to access various content items provided by a particular channel owner within a single interface.

Content viewer device 104 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. In certain implementations, content viewer device 104 can enable a user, such an individual to interact with one or more platforms (e.g., media sharing platforms, social networks, etc.) such as in order to view and/or or otherwise interact with various media content items and/or related content. Additionally, content viewer device 104 may run an operating system (OS) that manages hardware and software of the content viewer device 104. Various applications, such as mobile applications ('apps'), web browsers, etc. (not shown) may run on the content owner device (e.g., on the OS of the content owner device). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the content viewer device 104. Additionally, in certain implementations, content viewer device 104 can also include and/or incorporate various sensors and/or communications interfaces (including but not limited to those depicted in FIG. 2 and/or described herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

In certain implementations, the referenced content viewer device can enable the user/viewer to request, receive, and/or view multiple content items (e.g., video content items) within a viewing session. That is, it can be appreciated that an interface within which a media content item is being presented (e.g., a webpage that includes a media player through which a video content item is presented, an interface of a mobile application that includes a media player through which a video content item is presented, etc.) can also include various additional links or other selectable items through which additional content items (which, for example, may be related to the content item presently being displayed) can be requested, received, and/or viewed. Accordingly, it should be further understood that a user can request/view one media content item, and then subsequently request, view, and/or otherwise be provided with one or more other media content items (e.g., via the referenced links/selectable items) in a sequence (e.g., by selecting a link presented within an interface that includes one video content item in order to request/view another video content item). In certain implementations, such a sequence can be referred to as a 'viewing session.' It should be understood that while a 'session' may be described herein as pertaining to a session occurring on a single device (e.g., device 104), this is only for the sake of simplicity and/or clarity. However, in other implementations a single viewing session can occur across multiple devices that are associated with a single user. For example, a user may watch one video on a tablet device, followed by another video on a smartphone device, followed by another video on a desktop computer, and the referenced videos, by virtue of the sequence in which they are watched, e.g., within chronological proximity to one another on devices that are associated with a single user, can be considered a single viewing session, as in the manner described herein.

Figure 2:
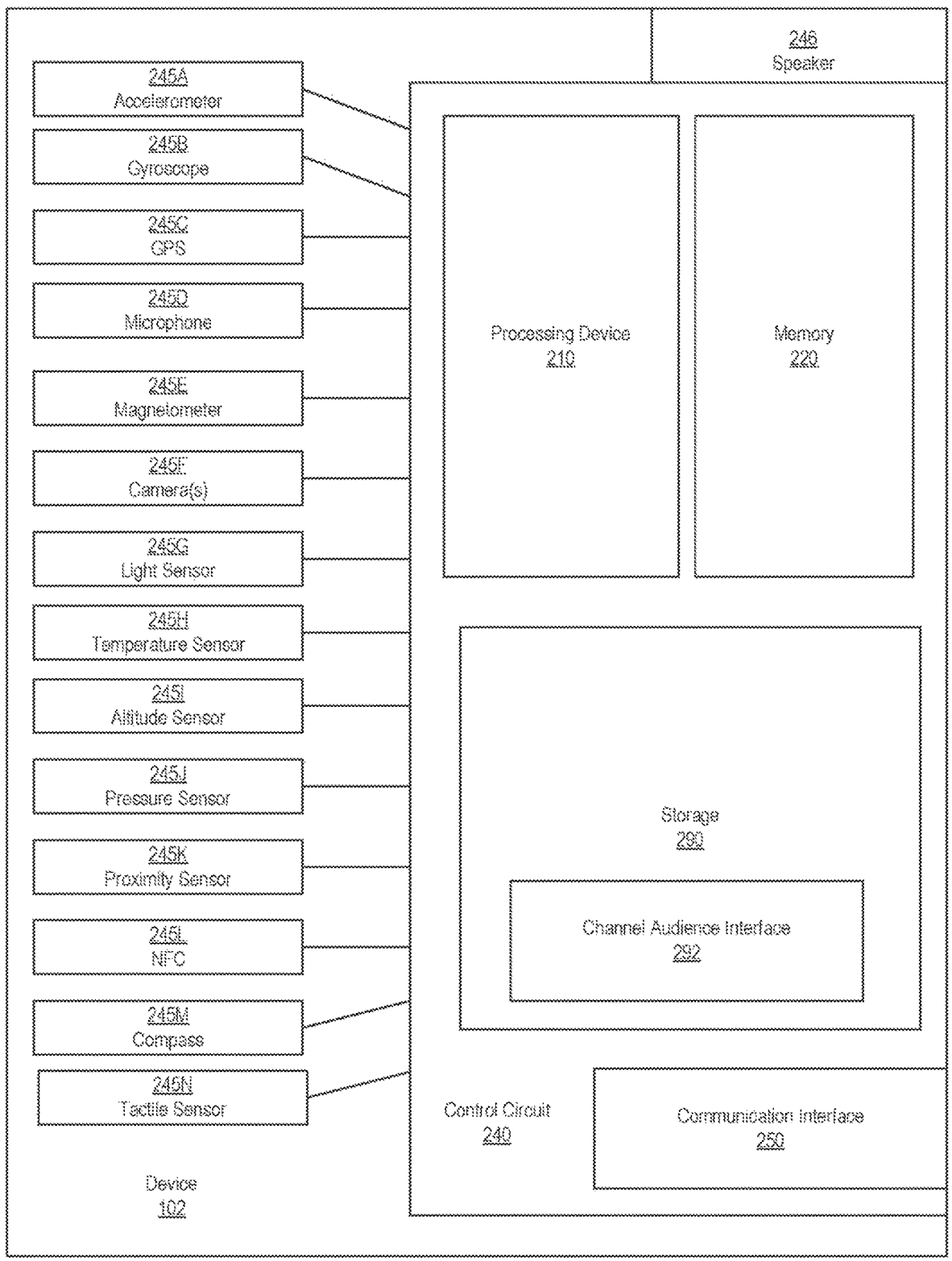
FIG. 2 depicts an exemplary implementation of a device in accordance with aspects and implementations of the present disclosure.

As noted, in certain implementations, user device(s) 102 and 104 (e.g., channel owner devices and content viewer devices) can also include and/or incorporate various sensors and/or communications interfaces. By way of illustration, FIG. 2 depicts one exemplary implementation of channel owner device 102. As shown in FIG. 2, device 102 can include a control circuit 240 (e.g., a motherboard) which is operatively connected to various hardware and/or software components that serve to enable various operations, such as those described herein. Control circuit 240 can be operatively connected to processing device 210 and memory 220. Processing device 210 serves to execute instructions for software that can be loaded into memory 220. Processing device 210 can be a number of processors, a multi-processor core, or some other type of processor, depending on the particular implementation. Further, processing device 210 can be implemented using a number of heterogeneous processor systems in which a main processor is present with secondary processors on a single chip. As another illustrative example, processing device 210 can be a symmetric multi-processor system containing multiple processors of the same type.

Memory 220 and/or storage 290 may be accessible by processing device 210, thereby enabling processing device 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above. Storage 290 also can be fixed or removable.

As shown in FIG. 2, storage 290 can store channel audience interface 292. In certain implementations, channel audience interface 292 can be, for example, instructions, an application, etc., that can be loaded into memory 220 and/or executed by processing device 210, in order to provide/present information pertaining to the audience of a channel via channel owner device 102, such as in a manner described herein.

A communication interface 250 is also operatively connected to control circuit 240. Communication interface 250 can be any interface (or multiple interfaces) that enables communication between user device 104 and one or more external devices, machines, platforms, systems, and/or elements (including but not limited to those depicted in FIG. 1 and described herein). Communication interface 250 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 104 to other computing devices, systems, platforms, and/or communication networks such as the Internet. Such connections can include a wired connection or a wireless connection (e.g. 802.11) though it should be understood that communication interface 250 can be practically any interface that enables communication to/from the control circuit 240 and/or the various components described herein.

At various points during the operation of described technologies, device 102 can communicate with one or more other devices, systems, platforms, servers, etc., such as those depicted in FIG. 1 and/or described herein. Such devices, systems, platforms, servers, etc., can transmit and/or receive data to/from the user device 102, thereby enhancing the operation of the described technologies, such as is described in detail herein. For example, device 102 can request information pertaining to the viewing audience of one or more video content items from server 120 via one or more of the referenced communication interfaces, and can receive such content via the referenced interface(s). It should be understood that the referenced devices, systems, platforms, servers, etc., can be in direct communication with user device 102, indirect communication with user device 102, constant/ongoing communication with user device 102, periodic communication with user device 102, and/or can be communicatively coordinated with user device 102, as described herein.

Also connected to and/or in communication with control circuit 240 of user device 104 are one or more sensors 245A-245N (collectively, sensors 245). Sensors 245 can be various components, devices, and/or receivers that can be incorporated/integrated within and/or in communication with user device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein. By way of example, inputs received via GPS receiver 245C can be processed to determine a location of device 102. The determination of such a location (based on inputs originating from GPS receiver 245C) can be utilized in a determination as to whether various other devices are located in the same location as (e.g., within the same city, country, etc.) and/or within a defined proximity of the referenced device, as described herein.

At this juncture it should be noted that while the foregoing description (e.g., with respect to sensors 245) has been directed to user device 102, various other devices, systems, servers, platforms, etc. (such as are depicted in FIG. 1 and/or described herein) can similarly incorporate the components, elements, and/or capabilities described with respect to user device 102. For example, content viewer device 104 may also incorporate one or more of the referenced components, elements, and/or capabilities. It should also be understood that certain aspects and implementations of various devices, systems, servers, platforms, etc., such as those depicted in FIG. 1 and/or described herein, are also described in greater detail below in relation to FIG. 6.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 120 can include components such as audience identification engine 130, media content store 140, and content viewing log 142. The components can be combined together or separated in further components, according to a particular implementation. It should be noted that in some implementations, various components of server machine 120 may run on separate machines. Moreover, some operations of certain of the components are described in more detail below. Additionally, in certain implementations, server machine 120 can also include and/or incorporate various sensors and/or communications interfaces (including but not limited to those depicted in FIG. 2 and described in relation to user device 104).

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Media content store 140 can include media content items 141A-141N. In certain implementations, media content items 141A-141N can correspond to media content itself (e.g., audio clips, video clips, images, etc.) and can be provided, for example, by a channel owner (e.g., channel owner device 102).

Content viewing log 142 can be hosted by one or more storage devices, such as main memory, magnetic or optical storage based disks, tapes or hard drives, NAS, SAN, and so forth. In some implementations, content viewing log 142 can be a network-attached file server, while in other implementations content viewing log 142 can be some other type of persistent storage such as an object-oriented database, a relational database, and so forth, that may be hosted by the server machine 120 or one or more different machines coupled to the server machine 120 via the network 110, while in yet other implementations content viewing log 142 may be a database that is hosted by another entity and made accessible to server machine 120.

Content viewing log 142 can include/maintain a record of viewing instances of the various media content items 141A-141N. Such a log can reflect, for example, the user that requested/viewed a particular video content item, the viewing duration of a viewing instance (e.g., the amount of time that the video content item was actually viewed), a channel owner associated with the video content item (e.g., the content provider that provided the content item to the media sharing platform), and various topics, tags, and/or other such metadata that can reflect aspects and/or characteristics of the media content item (e.g., the subject matter of the media content item). Additionally, content viewing log can maintain a record of the various content items included in a viewing session by a content viewer. As described herein, the referenced viewing session can reflect a sequence of media content items requested/viewed successively within a content presentation interface.

It should be understood that though FIG. 1 depicts server machine 120, and devices 102 and 104, as being discrete components, in various implementations any number of such components (and/or elements/functions thereof) can be combined, such as within a single component/system. For example, in certain implementations server machine 120 can incorporate features of channel owner device 102.

As described herein, various content viewing instances that occur within viewing sessions that include content originating from a particular content channel can be analyzed, e.g., in order to identify characteristics of such content viewing instances and/or sessions. In doing so characteristics of an audience of the particular content channel can be identified and can be provided via various notification(s), reporting tool(s), etc. In certain implementations, such operations can be performed by and/or in conjunction with audience identification engine 130.

Figure 3A:
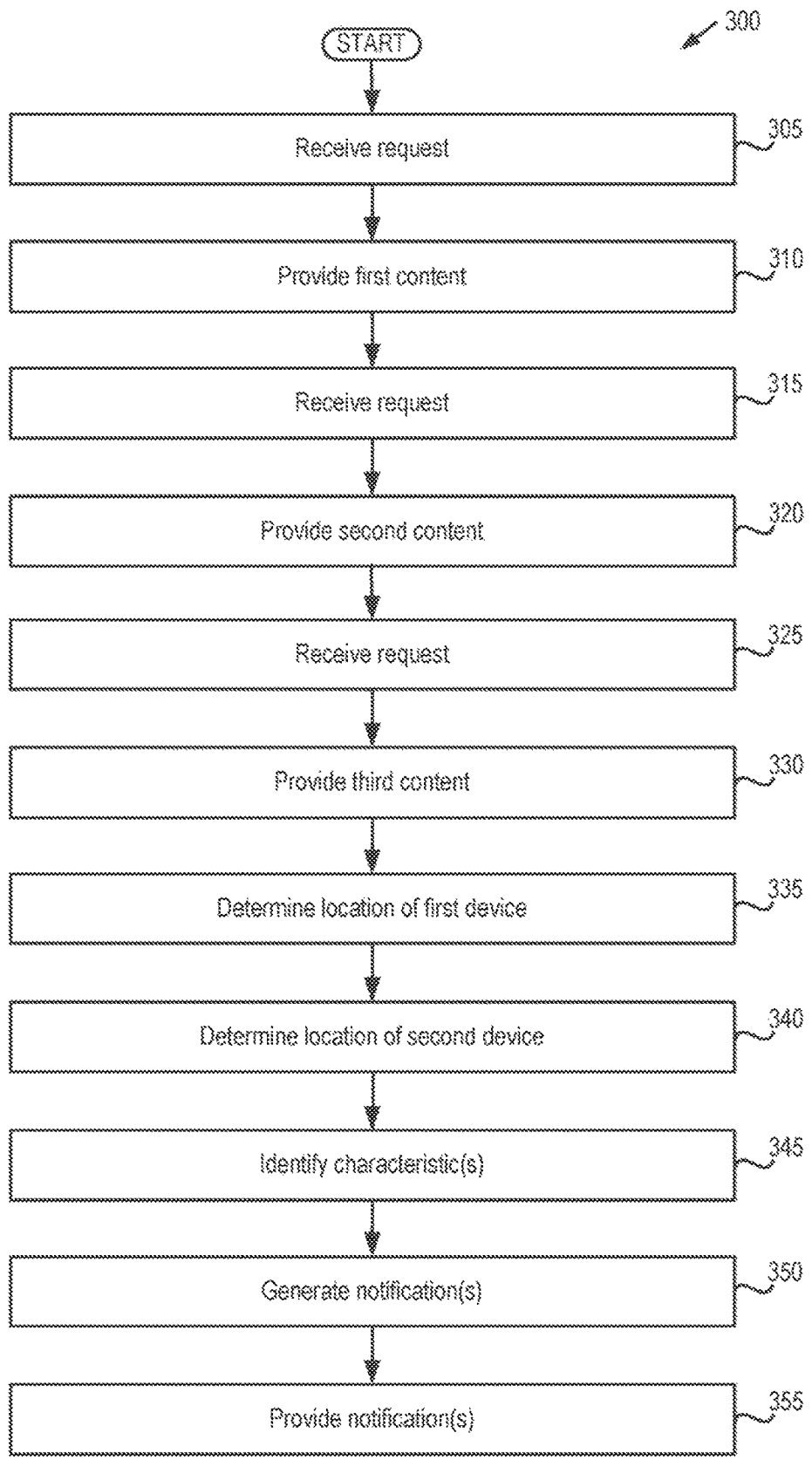
FIGS. 3A-3B depict flow diagrams of aspects of a method for identifying viewing characteristics of an audience of a content channel in accordance with aspects and implementations of the present disclosure.

FIG. 3A depicts a flow diagram of aspects of a method 300 for identifying viewing characteristics of an audience of a content channel. The method is performed by processing logic that may comprise hardware (circuitry, dedicated logic, etc.), software (such as is run on a computing device, such as those described herein), or a combination of both. In one implementation, the method is performed by server machine 120 of FIG. 1, while in some other implementations, one or more blocks of FIG. 3A may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 305, a request can be received. In certain implementations, such a request can be received from first user device (e.g., a content viewer device 104). Such a request can be, for example, a request for a video content item (e.g., as stored in media content store 140). For example, a user device can access and/or otherwise interact with media content items stored in media content store 140 via a web page or website (which may, for example, including an embedded media player through which such content items can be viewed) and/or a dedicated mobile application. Through such interfaces (as accessed at content viewer device 104), a user can search, browse, and/or otherwise request media content items (e.g., videos) from server machine 120. It should be understood that, in certain implementations, some or all of the referenced media content items can be associated with a respective channel owners (e.g., based on a corresponding channel owner device 102 providing, e.g., uploading, such a video content item to a media sharing platform). Additionally, in certain implementations, by virtue of having provided a particular video to the media sharing platform, such a video can be associated with/listed within a 'channel' associated with the channel owner. It should be understood that, in certain implementations, various aspects of block 305 can be performed by audience identification engine 130 and/or server machine 120, while in other implementations such aspects may be performed by one or more other elements/components, such as those described herein.

At block 310, a first video content item (e.g., the video content item with respect to which the request received at 305 corresponds to) can be provided (e.g., in response to the request). In certain implementations, such a video content item can be provided to a first user device (e.g., the content viewer device 104 from which the request for such video content item was received). Additionally, in certain implementations such a video content item can be provided to the referenced content viewer device 104 for presentation at a content presentation interface on the device. Such a content presentation interface can be, for example, a media player application embedded or otherwise incorporated within a webpage that is accessed by the device (e.g., via a web browser application executing on the device), a standalone application (e.g., a mobile app) having media playing capabilities, etc. It should be noted that a record/log of the described viewing instance (e.g., the providing of a video content item in response to the referenced request) as well as the various other viewing instances described herein is maintained at content viewing log 142. Such a log can reflect, for example, the various videos viewed during a viewing session and various characteristics associated with such videos, such as is described herein. It should also be understood that, in certain implementations, various aspects of block 310 can be performed by audience identification engine 130 and/or server machine 120, while in other implementations such aspects may be performed by one or more other elements/components, such as those described herein.

Figure 4:
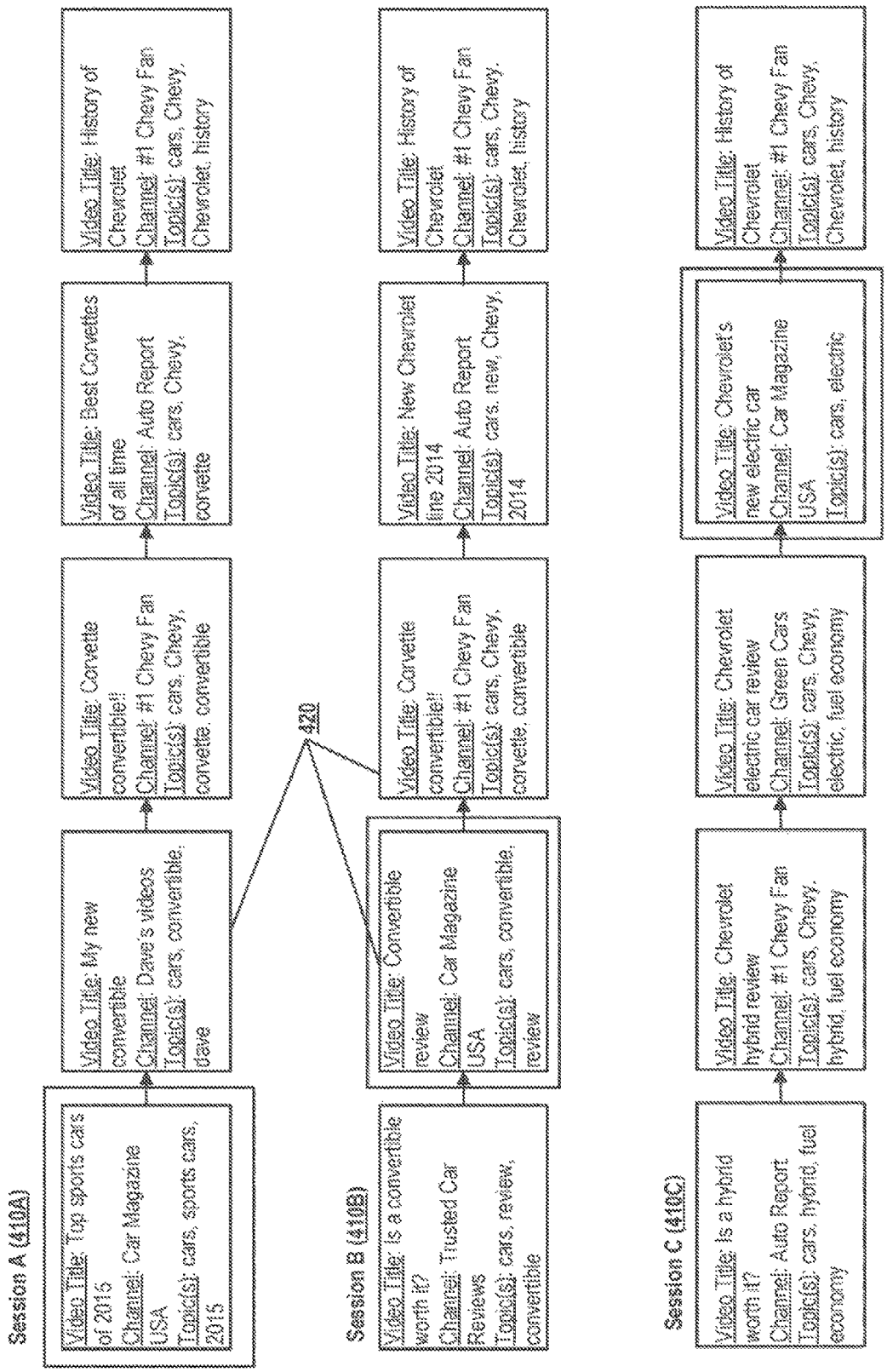
FIG. 4 depicts various exemplary viewing sessions in accordance with aspects and implementations of the present disclosure.

It should be understood that, in certain implementations the referenced video content item can be provided to the referenced content viewer device 104 for presentation at a content presentation interface during a viewing session. Such a viewing session can be, for example, a sequence of video content items that are requested by and/or presented at a content presentation interface on a user device (e.g., in response to selections received at the user device which, for example, can correspond to a respective video content item within the sequence). By way of illustration, FIG. 4 depicts various viewing sessions 410A, 410B, and 410C. As noted, such viewing sessions can reflect a sequence of content viewing instances 420 which correspond to the presentation of a video content item at a content viewing device 104. For example, as shown in FIG. 4 (and described in detail herein), viewing session 410A can begin with a viewing instance of the video 'Top sports cars of 2015' (as initiated by a user device based on the selection of such a video). The session then continues with a viewing instance of the video 'My new convertible' (as initiated by the user device based on the selection of this video during and/or at the conclusion of 'Top sports cars of 2015'), and progresses through various additional viewing instances, as shown.

It should be noted that in situations in which the systems discussed herein collect personal information about users, or may make use of personal information, the users may be provided with an opportunity to control whether programs or features collect user information (e.g., information about a user's media viewing history, interests, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

At block 315, a request for another video content item can be received (e.g., from the same device that requested the video content item at 305). In certain implementations, such a request can be received (e.g., from a content viewer device 104, such as the same device from which the request at 305 was received) in response to a selection received at the device during the first viewing session. That is, it can be appreciated that though a device is presenting/playing a first content item (e.g., via a content presentation interface such as a media player), the device can also provide selectable links, controls, etc., through which additional content items can be requested. By way of example, links to additional content items can be presented within the webpage that includes an embedded media player within which the referenced video content item is being presented (e.g., adjacent to such media player). By way of further example, upon completion of a presentation of a first video content item, one or more links, etc., to other media content items can be presented within the content presentation interface. Upon selection of such a link, a request can be provided to and/or received by a media sharing platform, and the requested content item can be provided to the user device in response (e.g., as described at 320). It should be understood that, in certain implementations, the referenced second video content item may be associated with a second channel owner (e.g., it may be provided to the media sharing platform by another channel owner and/or may be associated with a different channel than the video content item provided at 310). For example, as shown in FIG. 4 with respect to session 410A, first the video 'Top sports cars of 2015' (which is associated with the channel 'Car Magazine USA') can first be provided to the content viewer device and then (e.g., in response to a selection of a link at the content viewer device) the video 'My new convertible' (which is associated with the channel 'Dave's videos) can be provided to the content viewer device. As noted, the providing of such content items in sequence makes up a viewing session (here, session 410A, as depicted in FIG. 4). It should be understood that, in certain implementations, various aspects of block 315 can be performed by audience identification engine 130 and/or server machine 120, while in other implementations such aspects may be performed by one or more other elements/components, such as those described herein.

At block 320, the second video content item (e.g., the video content item requested at 315) can be provided for presentation at the content presentation interface on the first user device, e.g., during the first viewing session (that is, the same viewing session as the video content item provided at 310). For example, as shown in FIG. 4, the videos 'Top sports cars of 2015' and 'My new convertible' are included in viewing session 410A (which, as noted, reflects a sequence of videos provided to/viewed by a particular user device). It should be understood that, in certain implementations, various aspects of block 320 can be performed by audience identification engine 130 and/or server machine 120, while in other implementations such aspects may be performed by one or more other elements/components, such as those described herein.

At block 325, a request for a third video content item can be received. Such a third video content item may be from a channel owner than the first channel owner associated with the first content item that is requested at 305 and provided at 310. In certain implementations, such a request can be received, from a second user device (e.g., a content viewer device that is different from the content viewer device that requested the video content items at 305 and 315). In certain implementations, such a request can be received in response to a selection received at the second user device during a second viewing session. As described herein, such a second viewing session can also include a video content item associated with the same channel owner as another video content item included in the first viewing session (that is, the viewing session described with respect to 305-320). For example, as shown in FIG. 4, session 410B can reflect a viewing session that occurs with respect to a content viewer device that is different from the content viewer device that requested the video content items at 305 and 315. It can be appreciated that while session 410B includes different videos than session 410A, session 410B does include a video ('Convertible review') that is associated with the same channel owner (the channel 'Car Magazine USA') as a video in session 410A ('Top sports cars of 2015'). As described in detail herein, the presence of respective videos from a common channel within the respective sessions can reflect the type of content being viewed by the audience of a particular channel (e.g., 'Car Magazine USA'), as described herein. By way of further illustration, in certain implementations respective requests can be received (e.g., from different user devices) for various video content items during respective viewing sessions (e.g., sessions 410A, 410B, 410C, as shown in FIG. 4). It should be understood that each of the referenced sessions may include at least one content item that is associated with a particular channel owner (e.g., the channel 'Car Magazine USA,' as it can be appreciated with referenced to FIG. 4 that each of sessions 410A, 410B, and 410C include a video content item associated with this channel). It should be understood that, in certain implementations, various aspects of block 325 can be performed by audience identification engine 130 and/or server machine 120, while in other implementations such aspects may be performed by one or more other elements/components, such as those described herein.

At block 330, the third video content item (e.g., the video content item requested at 325) can be provided for presentation at a content presentation interface on the second user device, e.g., during the second viewing session. It should be understood that, in certain implementations, various aspects of block 330 can be performed by audience identification engine 130 and/or server machine 120, while in other implementations such aspects may be performed by one or more other elements/components, such as those described herein.

At block 335, a location of the first user device (e.g., the device that requested the video content item at 305) can be determined. In certain implementations, such a location can be determined based on one or more inputs that originate from one or more sensors of the device (e.g., geographic coordinates as received from GPS receiver 245C, an IP address as received via communication interface 250, and/or any other such inputs based upon which a location of the device can be determined). By way of illustration, upon receiving such input(s), the input(s) can be processed in order to determine a city, state, zip code, country, etc. within which a device is located. It should be understood that, in certain implementations, various aspects of block 335 can be performed by audience identification engine 130 and/or server machine 120, while in other implementations such aspects may be performed by one or more other elements/components, such as those described herein.

At block 340, the second user device (e.g., the content viewer device that requested the video content item at 325) can be determined to be located within a defined proximity of the first user device. (e.g., the device with respect to which a location was determined at 335). In certain implementations, such a determination can be computed based on one or more inputs that originate from one or more sensors of the second user device (e.g., geographic coordinates as received from GPS receiver 245C, an IP address as received via communication interface 250, and/or any other such inputs based upon which a location of the device can be determined). For example, upon determining the respective locations of the first device and the second device, such locations (e.g., geographical coordinates, addresses, zip codes, states, cities, etc.) can be compared in order to determine whether the devices are located within the same geographic location/region and/or within a defined proximity (e.g., 50 miles) of one another. Being that viewing audiences in different countries, regions, etc., can have significantly different viewing tendencies, it can be advantageous, in certain implementations, to compare/analyze viewing sessions that are associated with the same/proximate locations. In doing so, the results generated with respect to the described analyses of viewing characteristics can be more likely to be relevant to a particular audience. It should be noted, however, that in other implementations the described technologies can be implemented irrespective of geographic location, proximity, etc., with respect to the various content viewer devices associated with the viewing sessions being compared, analyzed, etc. It should also be understood that, in certain implementations, various aspects of block 340 can be performed by audience identification engine 130 and/or server machine 120, while in other implementations such aspects may be performed by one or more other elements/components, such as those described herein.

At block 345, one or more characteristics associated with the second video content item (e.g., the content item provided at 320) and the third video content item (e.g., the content item provided at 330) can be identified. Moreover, in certain implementations one or more characteristics associated with the one or more video content items requested during the respective viewing sessions (e.g., as described at 325) can be identified. By way of illustration, one or more topics associated with the second video content item, the third video content item, and/or the various content items requested during the referenced sessions can be determined. In certain implementations, the referenced characteristics (e.g., topics) can be determined using metadata associated with corresponding video content items. Such metadata can, for example, be received from the channel owner, e.g., when the video is provided (e.g., uploaded) to the media sharing platform. In other implementations, the referenced metadata can be determined automatically (e.g., by processing/analyzing the video content item or various aspects thereof). Additionally, in certain implementations such metadata can be stored with the corresponding content item, e.g., in media content store 140. It should be understood that, in certain implementations, various aspects of block 345 can be performed by audience identification engine 130 and/or server machine 120, while in other implementations such aspects may be performed by one or more other elements/components, such as those described herein.

By way of illustration, FIG. 4 depicts various viewing sessions 410A, 410B, and 410C, each of which include a video content item that is associated with a particular channel owner (e.g., a channel associated with such a channel owner), here, 'Car Magazine USA.' Having identified the referenced sessions as including a video from such a channel (and, in certain implementations, further determining that such sessions occurred with respect to devices present in a particular area, e.g., within the same country), further analyzing various characteristics of other videos within the referenced sessions can provide additional insights and indications regarding the interests of the audience that views content from the 'Car Magazine USA' channel. For example, it can be appreciated that each video content item can be associated with various topics, tags, keywords, and/or other such metadata (which may be manually and/or automatically associated with the content item). Such topics, keywords, etc. can reflect various aspects of the content of the video content item (e.g., the topics to which the video relates). For example, as shown in FIG. 4, the video 'Top sports cars of 2015' is associated with the topics 'cars,' 'sports cars,' and '2015.' Accordingly, having identified the sessions (e.g., sessions 410A, 410B, and 410C) each of which include a video from a particular channel (here, 'Car Magazine USA'), the various characteristics—e.g., the topics associated with—the other videos within such sessions can be determined. For example, each of the various video content items included in the referenced sessions can be processed in order to determine which topics are relatively more prevalent across all of the videos included in such sessions. By way of illustration, it can be determined, for example, that the topics 'cars,' and 'Chevy' are relatively more prevalent across the videos that appear within the referenced sessions (that is, those sessions that include a video from the 'Car Magazine USA' channel).

By way of further illustration, in addition to and/or instead of identifying those topics that are relatively more prevalent across the videos included in the referenced viewing sessions, identifying those channels from which relatively more videos present within such session originate can also provide additional insight. As noted, FIG. 4 depicts various viewing sessions, each of which include a video content item that is associated with/originates from the channel 'Car Magazine USA.' Having identified the referenced sessions as including a video from such a channel (and, in certain implementations, further determining that such sessions occurred with respect to devices present in a particular area, e.g., within the same country), an identification of those other channels from which content included in such sessions originates can provide further insights and indications regarding the interests of the audience that views content from the 'Car Magazine USA' channel. For example, it can be appreciated that each video content item can be associated with/originate from a content creator (e.g., a channel associated with such a content creator). As shown in FIG. 4, for example, the video 'My new convertible' is associated with the channel 'Dave's videos' and the video 'Corvette convertible!!' is associated with the channel '#1 Chevy Fan.' Accordingly, having identified the sessions (e.g., sessions 410A, 410B, and 410C) each of which include a video from a particular channel (here, 'Car Magazine USA'), the various other channels from which relatively more videos that appear in the referenced viewing sessions originate can be determined. By way of illustration, it can be determined, for example, that the channels '#1 Chevy Fan' and 'Auto Report' are the channels from which relatively more content items present in the referenced sessions originate (as compared to other channels).

By way of yet further illustration, in addition to and/or instead of identifying those topics that are relatively more prevalent across the videos included in the referenced viewing sessions and/or identifying those channels from which relatively more videos present within such sessions originate, identifying those video content items that are relatively more prevalent across the referenced sessions can also provide additional insight. As noted, FIG. 4 depicts various viewing sessions, each of which include a video content item that is associated with/originates from the channel 'Car Magazine USA.' Having identified the referenced sessions as including a video from such a channel (and, in certain implementations, further determining that such sessions occurred with respect to devices present in a particular area, e.g., within the same country), an identification of those videos that appear in relatively more of such sessions can provide further insights and indications regarding the interests of the audience that views content from the 'Car Magazine USA' channel. For example, as shown in FIG. 4, it can be determined that the video 'History of Chevrolet' (which appears in each of the depicted viewing sessions) and the video 'Corvette Convertible!!' (which appears in two of the three depicted viewing sessions) are included in relatively more of the viewing sessions that include video content items that are associated with/originate from the channel 'Car Magazine USA' (as compared to other video content items within such sessions).

It should also be noted that, in certain implementations, data associated with those videos that originate from the 'channel of interest' (that is, the channel with respect to which the most watched videos, topic, etc., occurring within sessions that includes videos from such a channel are being identified) can be filtered out of the referenced results/notifications. In doing so, the results/notification provided to the channel owner can reflect content from other channel owners (and not content from the owner's own channel). Additionally, in certain implementations those viewing instances that may have not been affirmatively initiated by a viewer can be filtered out. For example, viewing instances initiated by 'autoplay' (e.g., when a video, e.g., in a playlist, begins to play without the user providing an instruction for it to play) or 'autonavigation' (e.g., when a user is navigated to a video without the user providing a corresponding instruction) features, or initiated via a script, may be filtered out of the referenced results/notifications.

Figure 5A:
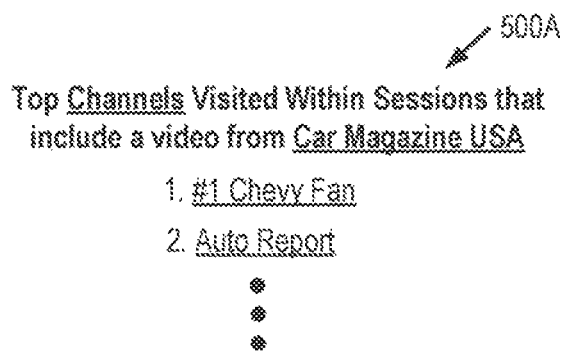
FIGS. 5A-5C depict various notifications in accordance with aspects and implementations of the present disclosure.
Figure 5B:
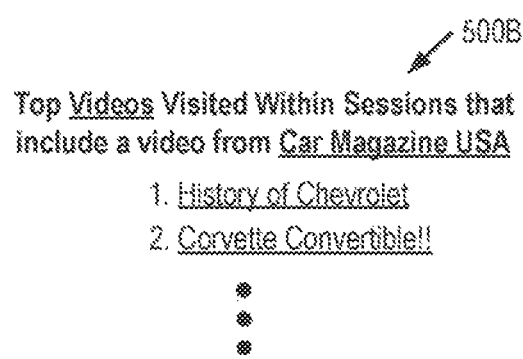
Figure 5C:
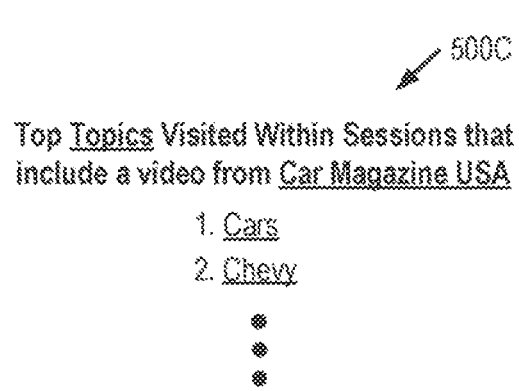

At block 350, a notification can be generated. In certain implementations, such a notification can include the various characteristic(s), such as those identified at 345. For example, FIGS. 5A, 5B, and 5C depict notifications 500A, 500B, and 500C, respectively, which reflect certain of the characteristics of the various sessions depicted in FIG. 4, such as are identified/determined at 345. As shown in FIGS. 5A-5C, in certain implementations the referenced characteristics (e.g., the channels from which content items appearing in sessions that include a content item from a particular channel originate, the topics associated with content items appearing in sessions that include a content item from a particular channel, etc.) can be prioritized, e.g., in a manner that orders such characteristics based on a relative prevalence of the referenced characteristics across the video content items of the respective viewing sessions. It should be understood that, in certain implementations, various aspects of block 350 can be performed by audience identification engine 130 and/or server machine 120, while in other implementations such aspects may be performed by one or more other elements/components, such as those described herein.

Figure 3B:
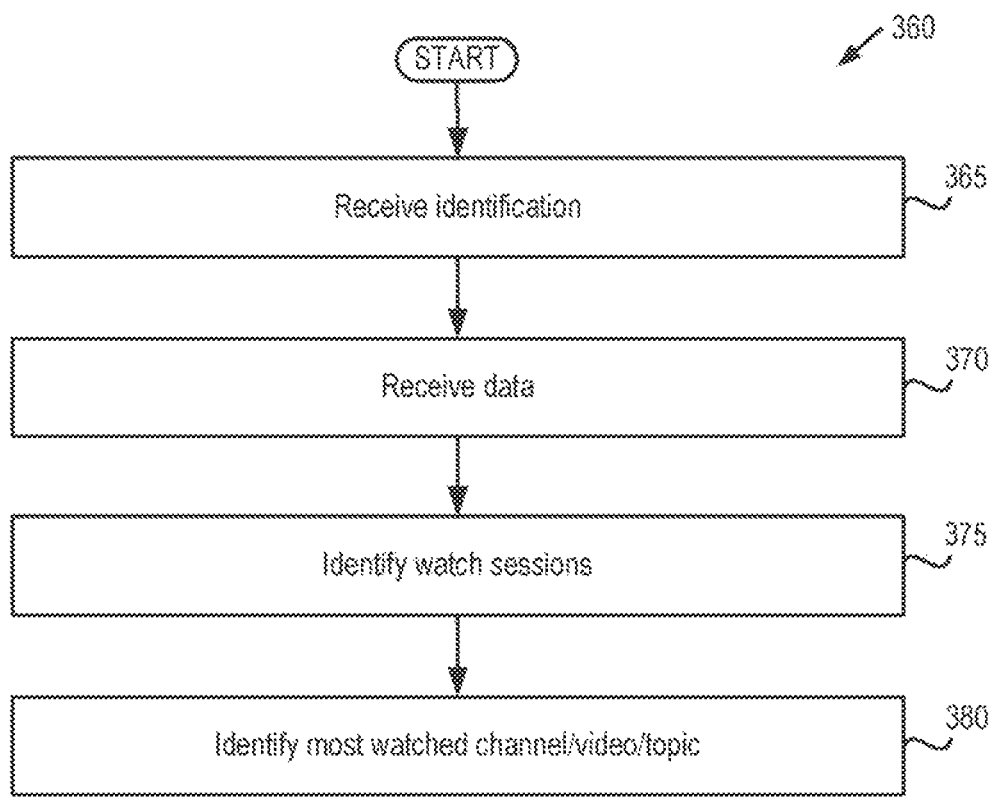

FIG. 3B depicts a flow diagram of aspects of a method 360 for identifying viewing characteristics of an audience of a content channel. The method is performed by processing logic that may comprise hardware (circuitry, dedicated logic, etc.), software (such as is run on a computing device, such as those described herein), or a combination of both. In one implementation, the method is performed by server machine 120 of FIG. 1, while in some other implementations, one or more blocks of FIG. 3B may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 365, an identification of a channel of interest can be received. Such a channel of interest can have various associated videos, such as is described herein in relation to FIG. 3A (e.g., with respect to block 345). It should be understood that, in certain implementations, various aspects of block 365 can be performed by audience identification engine 130 and/or server machine 120, while in other implementations such aspects may be performed by one or more other elements/components, such as those described herein.

At block 370, data for a plurality of watch sessions can be received, such as is described herein in relation to FIG. 3A (e.g., with respect to block 345). Such watch sessions can be those sessions in which multiple videos are watched. In certain implementations, such watch sessions can be those associated with a particular geographic location (e.g., a geographic location that is within a defined proximity of a particular geographic location). Additionally, in certain implementations such watch sessions can include sessions in which multiple videos are watched across multiple devices associated with a user, such as is described herein. Moreover, in certain implementations the referenced videos included in the watch sessions can be those videos that are watched in response to a selection received from a user. It should be understood that, in certain implementations, various aspects of block 370 can be performed by audience identification engine 130 and/or server machine 120, while in other implementations such aspects may be performed by one or more other elements/components, such as those described herein.

At block 375, at least two watch sessions of the plurality of watch sessions can be identified. Such identified watch session can include a watched video that is associated with the channel of interest, such as is described herein in relation to FIG. 3A (e.g., with respect to block 345). It should be understood that, in certain implementations, various aspects of block 375 can be performed by audience identification engine 130 and/or server machine 120, while in other implementations such aspects may be performed by one or more other elements/components, such as those described herein.

At block 380, a most watched channel, video, and/or topic in the at least two identified watch sessions can be identified, such as is described herein in relation to FIG. 3A (e.g., with respect to block 345). Such a most watched channel can be a channel that is most watched by viewers of the channel of interest but that is not the same as the channel of interest. In certain implementations the at least two identified watch sessions can be ordered based on respective watch counts associated with the at least two identified watch sessions. Additionally, in certain implementations, the plurality of watch sessions can be ordered based on respective watch counts associated with the plurality of watch sessions. Moreover, a most watched video in the at least two identified watch sessions can be identified. Such a most watched video can be a video that is most watched by viewers of the channel of interest but that is not the same as videos associated with the channel of interest. Additionally, a most watched topic in the at least two identified watch sessions can be identified. Such a most watched topic can be a topic of a highest number of videos in the watch session. It should be understood that, in certain implementations, various aspects of block 380 can be performed by audience identification engine 130 and/or server machine 120, while in other implementations such aspects may be performed by one or more other elements/components, such as those described herein. It should be understood that, in certain implementations, various aspects of block 305 can be performed by audience identification engine 130 and/or server machine 120, while in other implementations such aspects may be performed by one or more other elements/components, such as those described herein.

At this juncture, it should be noted that while the described technologies are directed to identifying viewing characteristics of an audience of a content channel, in certain scenarios the prevalence of a particular topic, channel, video, etc., within the referenced sessions may not necessarily reflect particular interest of the audience that make up such sessions in the referenced topic, channel, etc., but rather a broader popularity/interest in such topics, channels, etc. (e.g., even outside the audience of the referenced sessions). For example, certain topics (e.g., music, movies, dogs, cats, etc.) may be determined to be relatively more popular across all sessions and audiences. Accordingly, identifying the prevalence of such topics when considering certain viewing sessions may not necessarily be indicative of a particular interest in the referenced topics by the audience of the referenced sessions (but rather a general/overall interest in such topics across all audiences). Accordingly, in certain implementations, a relative prevalence of the referenced characteristics across the video content items of the respective viewing sessions (e.g., the viewing sessions that include content items from a particular channel, e.g., the 'Car Magazine USA' channel, as depicted in FIG. 4) can be compared with a relative prevalence of the referenced characteristics across one or more other viewing sessions (e.g., some or all viewing sessions that do not include content items from a particular channel, e.g., the 'Car Magazine USA' channel, such as all viewing sessions occurring in a particular country, location, etc.). Such a comparison can reflect, for example, that the referenced characteristics are actually relatively more prevalent within particular viewing sessions (as compared to all viewing sessions) or relatively less prevalent within particular viewing sessions (as compared to all viewing sessions), and the referenced characteristics can be weighted accordingly. In doing so, for example, the placement of the referenced characteristics within a notification can be prioritized, deprioritized, and/or otherwise adjusted based on the referenced comparison. By way of illustration, upon identifying that a particular characteristic is twice as prevalent within certain viewing sessions (e.g., those viewing sessions that each include a video originating from a particular channel owner) as compared to other viewing sessions (e.g., those viewing sessions that do not include a video originating from the referenced channel owner or all viewing sessions), the number of instances that that the referenced characteristic occurs with respect to the viewing sessions associated with a particular channel owner can be weighted/multiplied by two (thereby reflecting that the prevalence of this characteristic with respect to the referenced viewing sessions is double the prevalence of such a characteristic with respect to other viewing sessions).

For example, the described technologies can be further enhanced by computing a relevance score, e.g., for each channel, video and/or topic. Such a score can reflect, for example, the result of the multiplication of an 'interest above norm' metric (as described below) and the number of views the referenced channel, video, etc. received by viewers (referred to as the 'target audience') that also viewed content from a channel associated with a particular channel owner within the same session (referred to as the 'channel of interest').

The referenced 'interest above norm' metric can reflect, for example, how likely a viewer of a channel, video, or topic is to have also viewed a video from the channel of interest. For example, if 0.1% of the target audience watched video A but 0.05% of the population of the same country watched it, the 'interest above norm' of video A can be computed as 2 (because 0.05*2=0.1). As noted, the referenced score can be directed to a particular country because people from different countries often have a significant difference in their viewing patterns (due to local cultures, etc.).

By way of further example, in order to compute the interest above norm for a video, the channel of interest $(C_t)$ and all the videos in it such that $C_t=(c_1, c_2 \ldots c_n)$ can be considered, as well as all the sessions $(S_t)$ that contain one of these videos $c_1$ such that:

$$S_t=(v_1,v_2 \ldots v_n) \text{ where } \exists v_i \in C_t \text{ and } v_i \neq v_j \text{ and } S_t \subset S$$

Where, for example, S=all the sessions occurring on the media sharing platform for the last 30 days for a particular country.

The total views for each video (v) can be calculated such that $$\sigma_v = \Sigma_{i=1}^m v_i \text{ where } v_i \in S$$

$$\zeta_v = \Sigma_{i=1}^m v_i \text{ where } v_i \in S_t$$

The total views for all sessions $S_t$ and S can be calculated as follows:

$$\theta = \Sigma_{i=1}^m \Sigma S_i \text{ where } S_i \in S$$

$$\beta = \Sigma_{i=1}^m \Sigma S_i \text{ where } S_i \in S_t$$

where $\Sigma S_i$ is the total number of videos in $S_i$.

The above figures can then be combined to determine how much more interest each video has to the subgroup of sessions $S_t$. This is the interest above norm and is denoted as $\delta$:

$$\delta_v = (\zeta_v \times \theta)/(\beta \times \sigma_v)$$

It should be understood that, in certain scenarios, the above techniques may yield a low value for $\sigma_v$ with respect to certain videos. This may (incorrectly) reflect that a video's interest above norm has a high value when $\zeta_v \neq 0$. To account for this, in certain implementations, a filter can be applied on $\delta_v$ and such that values greater than X can be ignored. For example, setting X to a value of 500000 can filter much of the referenced 'noise.' Moreover, to smooth the rest of the referenced 'noise' the product of $\delta_v$ and $\sigma_v$ can be computed, which can reflect the relevance ($\alpha$):

$$\alpha_v = \delta_v \times \sigma_v$$

Additionally, by sorting the described results by $\alpha$, videos that are not only of high interest to the user sessions $S_t$ but also popular to many users who have a session in $S_t$ can be identified. In doing so, the remaining noise from low a numbers can be removed, resulting in results that reflect high quality videos that are highly targeted/relevant to users who have watched videos in $C_t$.

The described techniques can also be applied for the calculation of ac (channel relevance) and at (topic relevance). For example, to calculate at, each video can first be mapped to its associated topic (and then following the approach described above). To calculate ac, the average $\alpha_v$ of the videos owned by the channel of interest can be computed (and then the approach described above can be followed). At block 355, a notification (e.g., as generated at 350) can be provided to the first channel owner (e.g., the content provided associated with the request received at 305). Such a notification can be provided in any number of ways. For example, in certain implementations such a notification can be provided via an interactive reporting tool. By way of illustration, the referenced notification can be provided to channel owner device 102 for presentation at the device via channel audience interface 292. In other implementations such a notification can be provided and/or transmitted via various communication services, protocols, etc., e.g., email, via a website, etc. It should be understood that, in certain implementations, various aspects of block 355 can be performed by audience identification engine 130 and/or server machine 120, while in other implementations such aspects may be performed by one or more other elements/components, such as those described herein.

It should be noted that though much of the forgoing description is directed to implementations pertaining to video content items, the scope of the present disclosure is not so limited. Accordingly, it should be understood that the technologies described herein can be similarly implemented in any number of other settings and/or contexts. It should be understood that further technical advantages, solutions, and/or improvements (beyond those described and/or referenced herein) may also be enabled as a result of such implementations.

Figure 6:
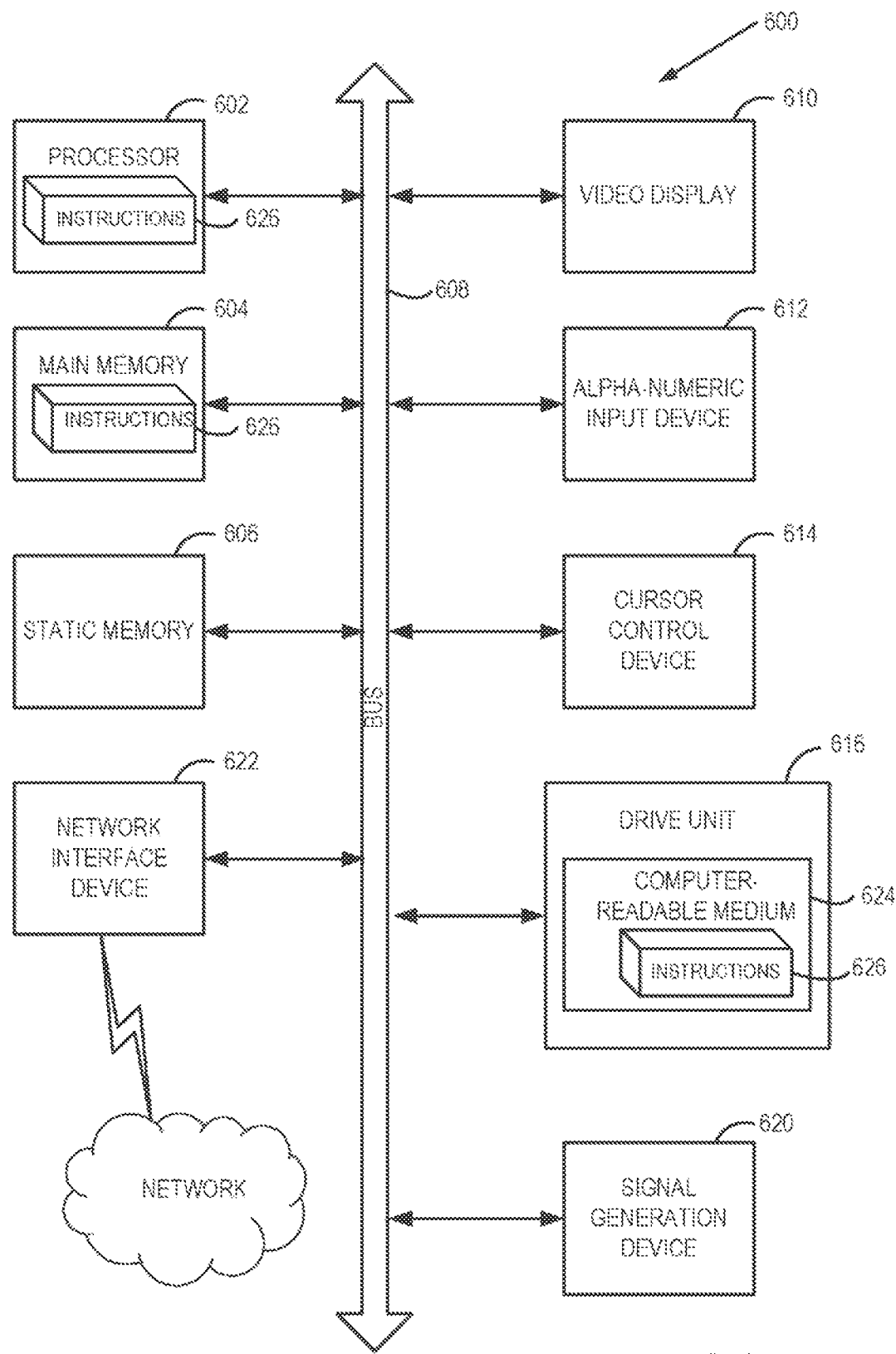
FIG. 6 depicts a block diagram of an illustrative computer system operating in accordance with aspects and implementations of the present disclosure.

FIG. 6 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 which may embody any one or more of the methodologies or functions described herein such as those performed by audience identification engine 130. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. In certain implementations, this apparatus may be specially constructed for the required purposes. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing, by a network-based media sharing platform, a plurality of watch sessions to a plurality of users;
   determining that the plurality of watch sessions comprises a subset of watch sessions that each include a first watched video from a first channel associated with a first channel owner and a second watched video from a second channel associated with a second channel owner, wherein the second watch video is associated with a popularity indicator representing lower popularity as compared to a set of other watched videos from the plurality of watch sessions;
   receiving, from a first user device of a first user, a request to watch the first watched video from the first channel as part of a watch session between the network-based media sharing platform and the first user device;
   identifying, based on the subset of watch sessions, the second channel as a next channel of interest for the first user, the second channel comprising the second watched video associated with the popularity indicator representing the lower popularity as compared to the set of other watch videos from the plurality of watch sessions; and
   providing a notification indicating characteristics of content of the second channel.

2. The method of claim 1, wherein each watch session in the subset of watch sessions is associated with a particular geographic location.

3. The method of claim 1, wherein each watch session in the subset of watch sessions is associated with a geographic location that is within a defined proximity to a particular geographic location.

4. The method of claim 1, wherein at least one watch session in the subset of watch sessions comprises a watch session where multiple videos are watched across multiple devices associated with a user.

5. The method of claim 1, wherein multiple videos included in the subset of watch sessions are watched in response to a selection received from a user.

6. The method of claim 1, further comprising identifying the second channel based on lower popularity of the second watched video with respect to the network-based media sharing platform and high popularity of videos of an additional channel from the subset of watch sessions.

7. The method of claim 6, wherein the high popularity of the videos of the additional channel corresponds to a most watched topic in the subset of watch sessions, the most watched topic being a topic of a highest number of videos watched during the subset of watch sessions.

8. A system comprising:
   a memory comprising instructions; and
   a processing device, coupled to the memory to perform the operations comprising:
   providing, by a network-based media sharing platform, a plurality of watch sessions to a plurality of users;
   determining that the plurality of watch sessions comprises a subset of watch sessions that each include a first watched video from a first channel associated with a first channel owner channel and a second watched video from a second channel associated with a second channel owner, wherein the second watch video is associated with a popularity indicator representing lower popularity as compared to a set of other watched videos from the plurality of watch sessions;

receiving, from a first user device of a first user, a request to watch the first watched video from the first channel as part of a watch session between the network-based media sharing platform and the first user device;

identifying, based on the subset of watch sessions, the second channel as a next channel of interest for the first user, the second channel comprising the second watched video associated with the popularity indicator representing the lower popularity as compared to the set of other watch videos from the plurality of watch sessions; and providing a notification indicating characteristics of content of the second channel.

9. The system of claim 8, wherein each watch session in the subset of watch sessions is associated with a particular geographic location.

10. The system of claim 8, wherein each watch session in the subset of watch sessions is associated with a geographic location that is within a defined proximity to a particular geographic location.

11. The system of claim 8, wherein at least one watch session in the subset of watch sessions comprises a watch session where multiple videos are watched across multiple devices associated with a user.

12. The system of claim 8, wherein multiple videos included in the subset of watch sessions are watched in response to a selection received from a user.

13. The system of claim 8, the operations further comprising identifying the second channel based on lower popularity of the second watched video with respect to the network-based media sharing platform and high popularity of videos of an additional channel from the subset of watch sessions.

14. The system of claim 13, wherein the high popularity of the videos of the additional channel corresponds to a most watched topic in the subset of watch sessions, the most watched topic being a topic of a highest number of videos watched during the subset of watch sessions.

15. A non-transitory computer readable medium comprising instructions, which when executed by a processing device, cause the processing device to perform operations comprising:

providing, by a network-based media sharing platform, a plurality of watch sessions to a plurality of users;

determining that the plurality of watch sessions comprises a subset of watch sessions that each include a first watched video from a first channel associated with a first channel owner channel and a second watched video from a second channel associated with a second channel owner, wherein the second watch video is associated with a popularity indicator representing lower popularity as compared to a set of other watched videos from the plurality of watch sessions;

receiving, from a first user device of a first user, a request to watch the first watched video from the first channel as part of a watch session between the network-based media sharing platform and the first user device;

identifying, based on the subset of watch sessions, the second channel as a next channel of interest for the first user, the second channel comprising the second watched video associated with the popularity indicator representing the lower popularity as compared to the set of other watch videos from the plurality of watch sessions; and providing a notification indicating characteristics of content of the second channel.

16. The non-transitory computer readable medium of claim 15, wherein each watch session in the subset of watch sessions is associated with a particular geographic location.

17. The non-transitory computer readable medium of claim 15, wherein each watch session in the subset of watch sessions is associated with a geographic location that is within a defined proximity to a particular geographic location.

18. The non-transitory computer readable medium of claim 15, wherein at least one watch session in the subset of watch sessions comprises a watch session where multiple videos are watched across multiple devices associated with a user.

19. The non-transitory computer readable medium of claim 15, wherein multiple videos included in the subset of watch sessions are watched in response to a selection received from a user.

20. The non-transitory computer readable medium of claim 15, the operations further comprising identifying the second channel based on lower popularity of the second watched video with respect to the network-based media sharing platform and high popularity of videos of an additional channel from the subset of watch sessions.

* * * * *